R. A. GALLY.
MUSIC ROLL GEARING.
APPLICATION FILED SEPT. 17, 1917.
1,276,342.
Patented Aug. 20, 1918.
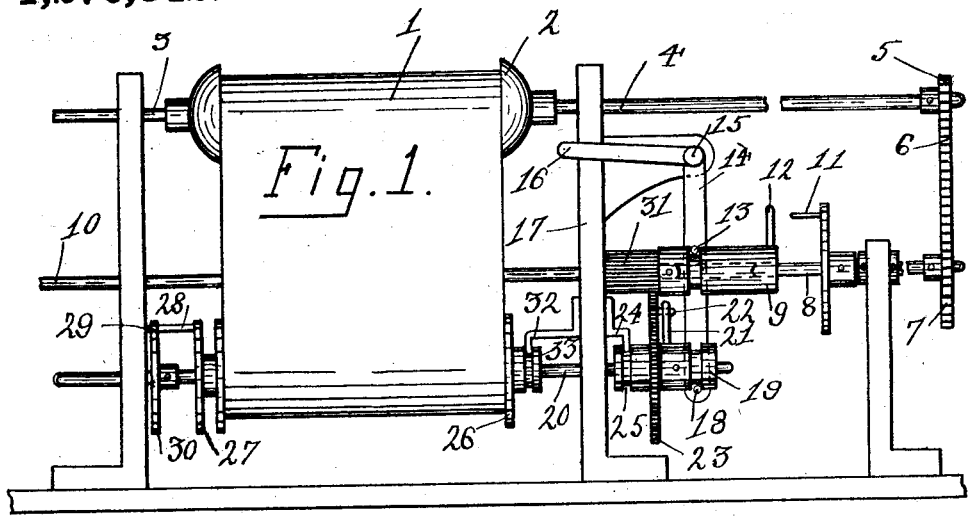
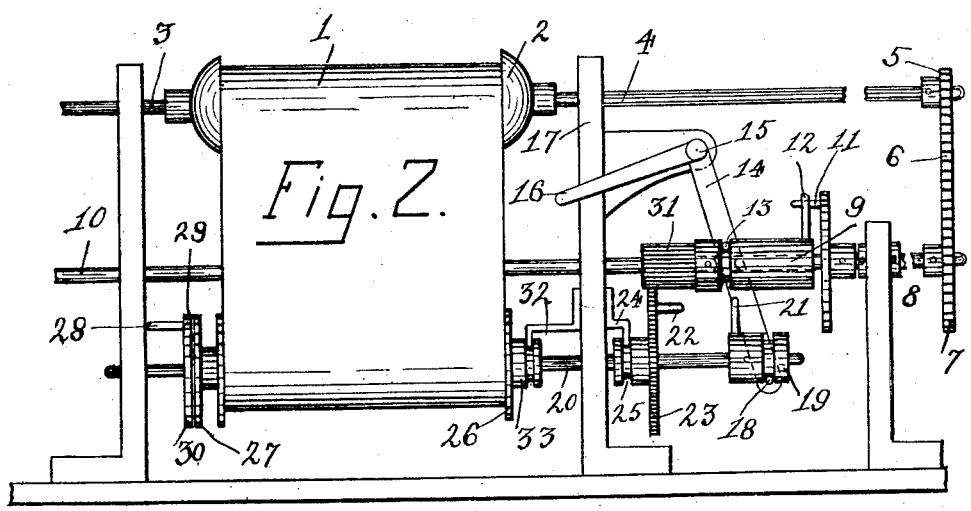
WITNESSES:
Herschel E. Power.
Wm. Stanhope.
INVENTOR:
Robt. A. Gally.

UNITED STATES PATENT OFFICE.

ROBERT A. GALLY, OF CINCINNATI, OHIO, ASSIGNOR TO THE BALDWIN COMPANY, OF CINCINNATI, OHIO.

MUSIC-ROLL GEARING.

1,276,342.  Specification of Letters Patent.  Patented Aug. 20, 1918.

Application filed September 17, 1917. Serial No. 191,806.

*To all whom it may concern:*

Be it known that I, ROBERT A. GALLY, a citizen of the United States, and residing at Cincinnati, in the county of Hamilton and State of Ohio, have invented certain new and useful Improvements in Music-Roll Gearing, of which the following is a specification.

Applicant's prior applications, #186,981, filed August 18, 1917, and #191805 filed Sept. 17th, 1917, show two forms of improved constant mesh gearing for music roll apparatus, #186,981, having its pinion fixed to its sliding shaft and the gear wheel driven thereby made slidable on the shaft of the take-up spool; and #191,805 having both pinion and gear wheel each fixed to its own slidable shaft; while in the present invention the pinion is fixed to its sliding shaft and the gear wheel is loose on its take-up spool shaft, but is guided to one position in direction of its axis and its said shaft slidable in the said gear wheel. The present and prior applications are all improvements in the art of constant mesh gear drive; an earlier form of which was patented by Arno, #596,768, January 4, 1898, but which Arno device and other subsequent structures had the drawback of a pinion loose on its shaft.

In the drawings Figure 1 is a front view of a roll gearing set for winding operation; and Fig. 2 is the same gearing set for the rewinding operation.

A music sheet 1 is mounted on the usual music roll 2, which roll 2 is carried by the two spindles 3, 4, the spindle 4 being the clutch spindle adapted to revolve the roll 2 for rewinding the sheet 1 on the roll 2, a sprocket 5 or other suitable drive means being fixed with the spindle 4 and connected by a chain 6 or other suitable connection from the sprocket wheel 7 or equivalent on the shaft 8 of the drive system. This shaft 8 extends loosely into a sleeve 9 fixed with the drive shaft 10, a clutch 11 fixed to the shaft 8 being adapted for engagement with a clutch 12 of the drive shaft 10 during rewind operation, as in Fig. 2, but for winding operation as in Fig. 1, the drive shaft is slid to the left by means of a pin 13 engaging a groove in the collar 9, the pin 13 being fixed with a shift lever 14 pivoted at 15 and shifted by means of its handle 16 extended within the roll frame 17, the leftward position of the lever 14, pin 13, and collar 9 and shaft 10 being set by the raising of the horizontal crank or arm 16 of the shifter means, the clutch 12 then being free from the clutch 11.

With the shifter means set to the leftward position of the lever 14 as in Fig. 1, the pin 18 on lever 14 has shifted to the left the collar 19 fixed on the slidable take-up shaft 20, the pin 18 being engaged in a groove in the collar 19. With the shaft 20 is a clutch 21 that at this leftward position of the shifter means is engaged with a corresponding clutch 22 fixed with the gear wheel 23, which gear wheel 23 is loosely mounted on the spool shaft 20, but guided to one position in the direction of its axis by a guide means 24 fixed to a stationary part of the apparatus as the frame 17, this guide means engaging a groove in the hub 25 of the gear wheel 23. The spool shaft 20 is extended freely through a bearing in the frame 17 and the take-up spool 26, the entire shaft 20 being slidable in its said bearing in frame 17, and in the spool 26, but the take-up spool 26 is always revoluble with the shaft 20 by means of a clutch means adapted to insure such common revolution but yet permit the sliding of the shaft, relative to the spool, such clutch means being now shown as a wheel or disk 27 fixed with the take-up spool 26 but loose on the shaft 20, this wheel or disk 27 having a clutch pin 28 extended from the face of the disk 27 and always engaging a hole or slot 29 in a clutch disk 30 attached to the spool shaft 20. With the shifter means set to this leftward position as in Fig. 1, the take-up spool 26 and its revolubly clutched shaft 20 are clutched to the gear wheel 23 by means of the clutches 21, 22, and the pinion 31 fixed on the drive shaft 10 and always meshed with the gear wheel 23 will cause the gear wheel 23, shaft 20, and take-up spool 26 to be revolved and the music sheet 1 to be wound on the said spool 26.

The drive shaft 10 is revolved by any suitable power means, as a wind motor, and by its revolution in one direction is enabled to both wind and rewind the music sheet through the several means now set forth.

With the shifter means set to the rightward position as in Fig. 2, the clutches 21, 22 are disengaged, thus freeing the shaft 20 and its take-up spool 26 from revoluble engagement with the gear wheel 23, so that although the gear wheel 23 is still, as always, meshed with the pinion 31, and the pinion 31 is still driving the gear 23, the spool 26 is entirely free from the drive action and can freely revolve in reverse direction as the music sheet 1 is withdrawn from that spool 26 by the music roll 2 as said roll 2 is driven by the clutch spindle 4, and its sprocket 5, the chain 6 and the sprocket wheel 7, the sprocket wheel 7 being engaged through its shaft 8 and clutch 11 with the clutch 12 of the drive shaft 10, the drive shaft 10 being revolubly driven as usual. The spool 26 is held in one position in the direction of its axis by means of guide 32 engaging collar 33 fixed with spool 26.

The separate mounting of the sprocket wheel 7 on the shaft 8 is of the particular type shown in applicant's prior Patent #1,106,297, August 4, 1914, but such detail is not necessary to the present invention, as the sprocket wheel 7 may be loosely mounted directly on the drive shaft 10 as in applicant's applications #186,981, and #191805 or may be of any other suitable arrangement.

The shifter means as now shown is especially compact, simple, and convenient. A horizontal shaft or pivot 15 has the shift lever 14 extended at an angle thereto, and pins 13 and 18 on the said lever 14 engage the grooves of the collars 9 and 19 as previously described. The various shifter parts are to the outside of the frame 17, and the horizontal arm or handle 16 extends across or through the frame 17 to the inner part between the frame pins, for easy control by the fingers of the operator, the handle 16 when raised securing the one position of shift, being for the winding operation in the present showing, and the handle 16 when lowered securing the other position of shift.

Various modifications may be made and yet not depart from the gist of the present invention, for what I claim as my invention, is:—

1. A take-up spool and guide means adapted to retain the said spool in one position as to its length; a slidable and revoluble shaft on which said spool is mounted; clutch means adapted to always engage said spool and shaft for revolution together but to allow the said shaft to slide longitudinally relatively to the said spool; a gear wheel loosely mounted on the said shaft and a guide means adapted to retain the said gear wheel in one position in the direction of its axis; and a clutch means adapted to engage and disengage the said gear and shaft from revoluble connection together.

2. A take-up spool and guide means adapted to retain the said spool in one position as to its length; a slidable and revoluble shaft on which said spool is mounted; clutch means adapted to always engage said spool and shaft for revolution together but to allow the said shaft to slide longitudinally relatively to the said spool; a gear wheel loosely mounted on said shaft and a guide means adapted to retain the said gear wheel in one position in the direction of its axis; and clutch means adapted to engage and disengage the said gear and shaft from revoluble connection together; and means adapted to revolve the said gear.

3. A take-up spool and guide means adapted to retain the said spool in one position as to its length; a slidable and revoluble shaft on which said spool is mounted; clutch means adapted to always engage said spool and shaft for revolution together but to allow the said shaft to slide longitudinally relatively to the said spool; a gear wheel loosely mounted on said shaft and a guide means adapted to retain the said gear wheel in one position in the direction of its axis; and clutch means adapted to engage and disengage the said gear and shaft from revoluble connection together; and means adapted to revolve the said gear at both its engaged and disengaged conditions.

4. A take-up spool and guide means adapted to retain the said spool in one position as to its length; a slidable and revoluble shaft on which said spool is mounted; clutch means adapted to always engage said spool and shaft for revolution together but to allow the said shaft to slide longitudinally relatively to the said spool; a gear wheel loosely mounted on the said shaft and a guide means adapted to retain the said gear wheel in one position in the direction of its axis; and clutch means adapted to engage and disengage the said gear and shaft from revoluble connection together; a slidable and revoluble drive shaft having a pinion fixed therewith and constantly engaging the said gear; a music roll spindle and means adapted to drive the said spindle in reverse direction to the take-up revolution of the take-up spool; clutch means adapted to revolubly engage the said reverse drive means and the said drive shaft; and shifter means adapted to engage either one of the said clutches and at the same time disengage the other one of the said clutches.

5. A roll gearing having a vertical side frame; gears, shafts and clutches mounted on the said frame; and a shifter means combined with the said gears, shafts and clutches, the said shifter means comprising a member mounted on said frame revoluble on a horizontal axis extended front and rear of the said frame, and pivotally mounted to the said frame, and said shifter means fixed with the said member and engaging with elements of the said gears, shafts and clutches; and a handle connected to said shifter means and revoluble on the same said axis and extended horizontally from and transversely to said axis.

6. A roll gearing having a vertical side frame; gears, shafts and clutches mounted on the said frame and at the outer side thereof; and a shifter means combined with the said gears, shafts and clutches, the said shifter means comprising a member mounted on the said frame on a revoluble axis and on the same said outer side of the said frame as the said gears, shafts, and clutches; and said shifter means fixed with the said member and engaging with elements of the said gears, shafts and clutches; and a handle connected to said shifter means and revoluble on the same said axis and extended horizontally from and transversely to said axis and to the inner side of the said frame.

ROBT. A. GALLY.

Witnesses:
PAUL J. HENGGE,
NORMA KEISER.

Copies of this patent may be obtained for five cents each, by addressing the "Commissioner of Patents, Washington, D. C."